United States Patent [19]

Meulenberg, Jr.

[11] 4,329,731
[45] May 11, 1982

[54] DISCHARGE SUPPRESSING DIELECTRIC FILM FOR USE ON SPACECRAFT SURFACES

[75] Inventor: Andrew Meulenberg, Jr., Gaithersburg, Md.

[73] Assignee: Communications Satellite Corporation, Washington, D.C.

[21] Appl. No.: 145,086

[22] Filed: Apr. 30, 1980

[51] Int. Cl.³ .............................................. H05F 3/00
[52] U.S. Cl. ................... 361/218; 244/1 A; 428/922
[58] Field of Search ............... 361/218; 244/1 R, 1 A, 244/31; 428/922, 931

[56] References Cited

U.S. PATENT DOCUMENTS 4,078,107  3/1978  Bitterice et al. ................. 428/922 X
4,101,689  7/1978  Wienand et al. ................. 428/922 X

OTHER PUBLICATIONS

"Lightning Protection on Advanced Fighter Aircraft"-Weinstock, 1970, Lightning and Static Electricity Conference, San Diego, CA., U.S.A., Dec. 9-11, 1970.

Primary Examiner—Harry E. Moose, Jr.
Attorney, Agent, or Firm—Sughrue, Mion, Zinn, Macpeak and Seas

[57] ABSTRACT

A dielectric film is provided with a metallic back layer for use as the outer layer in a multi layer "thermal blanket" employed as part of the temperature control system for a spacecraft. The dielectric film is repeatedly punctured from the metallized side in order to produce a plurality of small holes, which collect a disproportionately large current from the plasma and adjacent charged surface. The rough edges of these holes also act to initiate frequent, small, field emissions, thereby preventing large surface potentials from building up in the presence of a "hot" space plasma or electron beam environment.

2 Claims, 4 Drawing Figures

20 KEV ELECTRON BEAM FLOODING SURFACE

DISCHARGE SUPPRESSING DIELECTRIC FILM FOR USE ON SPACECRAFT SURFACES

BACKGROUND OF THE INVENTION

Dielectric films having thin optically reflecting metallic coatings on the back side thereof have been used as the outer layer of multi layer thermal blankets employed for the temperature control of spacecraft. It is well known that spacecraft in earth orbit are subject to constant bombardment by charged particles of both positive and negative polarity. Therefore, such dielectric film surfaces can become charged to a very high potential in a space plasma environment. In certain circumstances, the resulting potentials due to this bombardment can be quite high, and break down field strengths can be exceeded. Furthermore, the energy associated with charge storage on a large area thin dielectric can be very large by the time normal breakdown potentials are reached.

It is known that in certain types of spacecraft, the induced potentials have caused different, electrically isolated segments of the spacecraft surface to assume greatly divergent potentials. This potential difference can become great enough to cause an electric discharge between the different segments, resulting in damage to electronic circuitry within the spacecraft.

U.S. Pat. No. 3,906,308 to Amason et al discloses the use of an aircraft lightning protection system utilizing dielectric materials in the form of coatings and/or films applied to critical components of the aircraft. The patent states that test data have been obtained using a Kapton film as a shielding material on an aluminum honeycone core composite test panel, as described in column 10 of the patent. In operation, the dielectric material is applied to a portion of the aircraft in which a component is to be protected. Current due to lightning is thus prevented from attaching to or transferring through the protected component due to the reduced conducting properties of the dielectric material. To protect large aircraft skin areas, metal strips of appropriate dimensions are affixed or bonded on the dielectric material surface to provide conduction paths for the lightning current. In contrast to the present invention, Amason et al does not appear to teach any puncturing of the outer dielectric film in order to make or facilitate the making of electrical conduction paths.

U.S. Pat. No. 3,989,984 to Amason et al and U.S. Pat. No. 3,755,713 to Paszkowski relate to aircraft lightning protection means and aircraft static electricity control means consisting of conductive mesh structures attached to the outer surface of a nonconductive material on the aircraft's outer surface. Again, the puncturing of the nonconductive material to facilitate electrical conduction is not disclosed or suggested by these references.

U.S. Pat. No. 3,184,742 to Cutler discloses a balloon communication satellite which utilizes a perforated structure as part of a method for obtaining desired heat transmission characteristics. However, Cutler describes the outer surface of the balloon communication satellite as consisting of a perforated aluminum coating 16 on a mylar sheet 14. Thus, the structural design is the reverse of that of the present invention. Further, it is noted that the Cutler disclosure is not directly concerned with reducing charge buildups on the outer surface of spacecraft.

U.S. Pat. No. 3,984,730 to Hunter relates to a method and apparatus for neutralizing potentials induced on spacecraft surfaces. However, in contrast to the present invention, the apparatus operates by generating charged particles which are released on the surface of the spacecraft to counteract charge buildups which have been sensed by charged particle detectors located on the surface of the spacecraft.

Examples of other devices which relate to subject matter similar to that of the present application include the following: U.S. Pat. No. 3,283,210 to Welsh; U.S. Pat. No. 3,968,405 to Testone; U.S. Pat. No. 3,971,024 to Clark, U.S. Pat. No. 2,583,540 to Bennett; U.S. Pat. No. 3,106,663 to Tanner; U.S. Pat. No. 3,170,087 to Tanner; and U.S. Pat. No. 3,633,068 to Miller.

BRIEF DESCRIPTION OF THE INVENTION

The discharge suppressing dielectric film of the present invention is provided with a metallic back layer and is used as the outer layer in a multi layer thermal blanket for a spacecraft. The dielectric film has a structure which reduces charging and significant discharges on the outer surface of the spacecraft in a "hot" space plasma or electron beam environment. The dielectric film is provided with a metallized back layer and is punctured from the metallized side at frequent intervals, and the rough metallic edges of the punctures cause frequent small field emissions, thereby preventing a large surface potential from building up on the spacecraft surface. The structure thus results in continuous or micro discharges which replace the potentially dangerous large breakdown discharges resulting from large surface potentials. Alternately, the formation of micro hole patterns in the dielectric by ion beam etching may provide access to the necessary ground points, or metallic fibers may be sewn or pressed through the dielectric to the metallic rear surface to provide the grounding and field emission points necessary to provide such protection.

The main object of this invention is to provide a dielectric film structure which is protected to a great extent from significant charging and discharging in a "hot" space plasma or electron beam environment.

Another object of this invention is to provide a discharge suppressing film which prevents the buildup of large surface potentials by allowing continuous or micro-discharges between the surface of a dielectric material and the metallic surface.

Still another object of this invention is to provide a dielectric film which reduces the area likely to be discharged at a given time, the probability of abrupt discharge, and the influence of any discharge on the spacecraft system.

A still further object of this invention is to provide a discharge suppressing film which is simple in construction and is manufactured at low cost of a material which is already space qualified.

These, together with other objects and advantages which will subsequently become apparent, reside in the details of construction and operation as more fully herein after described and claimed, reference being had to the accompanying drawings forming a part hereof, wherein like numerals refer to like parts throughout.

DETAILED DESCRIPTION OF THE INVENTION

Figure 2:
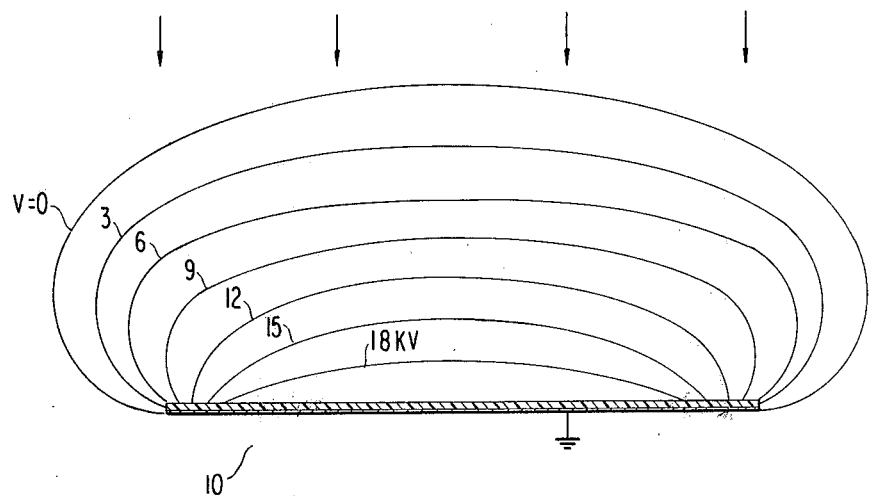
FIG. 2 is a side view of a smooth dielectric coating, illustrating the buildup of charge on the surface thereof due to bombardment by a "hot" plasma or electron beam.

Referring now more specfically to the drawings, the numeral 10 generally designates a dielectric film with a thin optically reflecting metallic coating on the backside thereof. The dielectric layer 12 may be formed of Kapton (a product of E. I. Dupont Company), and the metallic layer 14 on the bottom thereof may be formed of aluminum. In use, the aluminized Kapton is normally situated on the exterior of a spacecraft such that the dielectric layer faces outwardly into space. The dielectric layer is subject to constant bombardment by charged particles, which may cause a large build up of surface potential over time. Illustrated in FIG. 2 are the equi-potential field lines corresponding to the built up charge on the outer surface of a planar, unperturbed dielectric. As will be seen from this Figure, the plane of zero potential relative to the spacecraft appears at quite a distance from the surface of the dielectric (the actual distance depends on the plasma density.)

Figure 1:
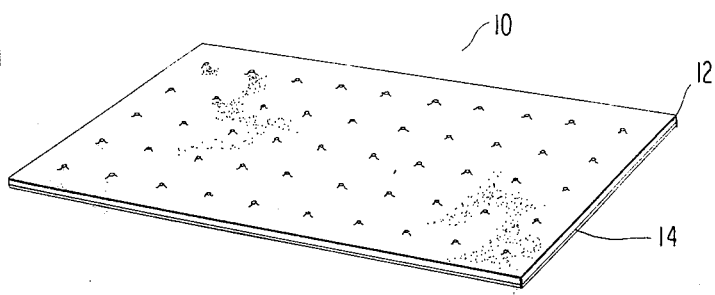
FIG. 1 is an elevational view of the dielectric film of the present invention.
Figure 1A:
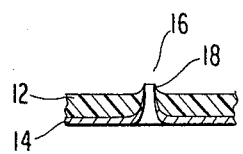
FIG. 1a is an enlarged view of a section of the film shown in FIG. 1 illustrating a perforation.
Figure 3:
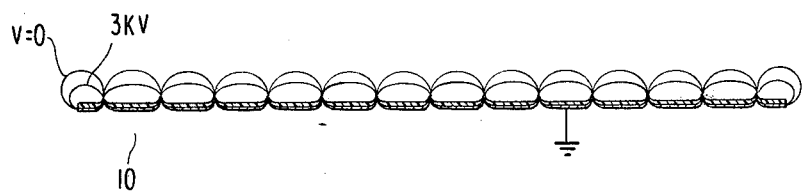
FIG. 3 is a side view similar to that of FIG. 2, illustrating the perforated dielectric of the present invention.

In order to eliminate this unwanted charge build up, the aluminized Kapton dielectric film is punctured repeatedly from the aluminum coated side as seen in FIGS. 1a and 3. The sizes of the holes thus produced is variable, with the limiting factor that the holes should comprise approximately 0.1% to 10%, and preferably about 1% of the total area of the dielectric film. In this manner, there will be sufficient hole surface area to prevent charge buildup, but at the same time, the other essential characteristics of the film, i.e. its thermal qualities, will remain essentially unchanged.

In the case of punching the film by using a mechanical punching means, the holes may be uniformly produced with a diameter of approximately $100\mu$ to $150\mu$. In this case, the distance between adjacent holes will be on the order of 1 mm to 20 mm. When the holes are produced by alternate methods, such as by ion beam etching for example, the diameter of the hole may be reduced to a value approximating $1\mu$. In this case, however, the spacing between adjacent holes is correspondingly reduced to a value on the order of $100\mu$ to $1000\mu$.

When the material is mounted on a spacecraft, the micro ruptures 16 are facing into space, and the rough, metallic edges 18 of these ruptures act to initiate field emissions by reason of the greatly increased field strengths in the immediate vicinity of a rupture point. Therefore, continuous or micro discharges replace the potentially dangerous large breakdown discharges resulting from large surface potentials. As seen in FIG. 1a, the aluminum 14 on the back surface of the dielectric layer 12 is pressed through to the front surface of the dielectric at the puncture points, which therefore serve as ground points on this surface.

These ground points, so produced, serve to terminate many electric field lines that would otherwise extend into space. As seen in FIG. 3, field lines are caused to terminate at each of the rupture points 16, thereby reducing the distance from the surface at which the plasma terminates the remaining field lines. Therefore, a plane of zero potential relative to the spacecraft is established much closer to the dielectric surface than is the case with a smooth surface. As a result, any charge leaving the surface, continuously or abruptly, will be neutralized more rapidly and therefore cause much less disturbance to the spacecraft, or the electronic components carried therein.

The plurality of rupture points also serve to redirect the incoming plasma particle distribution by means of the field lines, which terminate at each puncture. The flow of electrons from the plasma will be shifted from a uniform distribution over a smooth surface to one in which more electrons are directed toward the rupture points. This new distribution of incoming plasma particles serves to lower the potential between adjacent rupture points (by reducing the number of electrons impacting the areas away from the holes) and increases the charge accumulation near the points from which it can more easily bleed off. Further, the presence of more incident electrons in the vicinity of the holes increases the surface and bulk conductivity in these regions which still further reduces any excess charge concentrations.

Even when the ideal condition (of hole spacing close enough to provide overlapping surface potential gradients) is not possible, the probability of large surface discharges is still reduced. The large surface gradients near the holes not only increase the flow of electrons across the surface to the holes, they also accelerated secondary electrons toward the hole in a cascade so that current collection of the holes might be orders of magnitude greater than expected from simple electrostatic and surface conductivity analÿsis. In the wide spacing regime the zero potential plane may not extend to the holes. In this case, secondary electrons are trapped in the vicinity of a hole and may generate many tertiary electrons before finally being collected by a hole. The micro discharges initiated at the holes also reduce the surface potential away from the holes by generating a plasma, the positive portion of which will migrate to the negatively charged surface between the holes. The negative charge is reduced by the presence of these positive ions and also by the loss of secondary electrons resulting from collision of the positive ions with the surface. It is seen that some methods of charge suppression are independent of the edge roughness of the holes and depend solely upon the proximity of a ground potential on the surface to create a strong potential gradient.

Thus, it is seen that the use of puncture holes in the metallized dielectric surface act to provide ground points and sources of continuous discharge to keep the surface potentials at a low level. However, it is not necessary to the invention that the rough edges of the ruptures act to initiate the field emission, as alternative methods of performing this function can be envisioned. In particular, instead of forming the holes by puncturing the film from the backside thereof, the formation of micro hole patterns in the dielectric by ion beam etching, for example could provide the necessary ground points without the rough edges formed by puncturing. Additionally, metal fibers may be sewn or pressed through the dielectric to provide the grounding and field emission points at regular intervals throughout the film.

The foregoing is to be considered as illustrative only of the principles of the invention. Further, since numerous modifications and changes will readily occur to those skilled in the art, it is not desired to limit the invention to the exact construction and operation shown and described above, and accordingly, all suitable modifications and equivalents may be resorted to, following within the scope of the invention.

I claim:

1. In a spacecraft of the type having a film coating thereon, said coating comprising a layer of dielectric material overlying a metallic layer, the improvement comprising: a plurality of points of ground potential exposed through said dielectric film, and a plurality of apertures in said dielectric film, said apertures containing grounded conductors for suppressing abrupt electric discharge through said dielectric film wherein said apertures comprise punctures formed by pushing said metallic layer through said dielectric film from the metallized side thereof.

2. A discharge suppressing dielectric film as defined in claim 1, wherein said holes comprise between 0.1% to 10%, and preferably approximately 1%, of the surface area of the film.

* * * * *